C. M. WHEELOCK.
BUSHING FOR ELECTRIC TUBULAR INSULATION.
APPLICATION FILED NOV. 16, 1912.

1,098,775. Patented June 2, 1914.

Carl M. Wheelock, Inventor

Witnesses
Edward Kozick.
Eleanor Rink

By George Elmore Colby
Attorney

UNITED STATES PATENT OFFICE.

CARL M. WHEELOCK, OF MILWAUKEE, WISCONSIN, ASSIGNOR TO THE T.-W. MANUFACTURING COMPANY, A CORPORATION OF WISCONSIN.

BUSHING FOR ELECTRIC TUBULAR INSULATION.

1,098,775.  Specification of Letters Patent.  Patented June 2, 1914.

Application filed November 16, 1912. Serial No. 731,655.

*To all whom it may concern:*

Be it known that I, CARL M. WHEELOCK, of Milwaukee, Wisconsin, have invented a Bushing for Electric Tubular Insulation, of which the following is a specification.

My invention relates to means for holding in place at outlets and other points a flexible tubing for electric wires such as that known to the trade as "circular loom," being a tube woven of textile materials and saturated with insulating compounds.

My object is to provide a means for securely attaching the tubing to the edges of openings such as those in cutout boxes, the wall of which is a thin metal plate; and to provide a means which is readily put in place without the use of tools and can also be detached and removed when necessary, but cannot become loose or detached of itself. Further, I aim to provide such a device as will not puncture, scar or injure the tubing in any way, and will on the contrary protect it from abrasion on the sides of the opening, and can be produced and marketed at a trifling cost.

The nature of my invention is best illustrated in the accompanying drawings, wherein—

Figure 1:
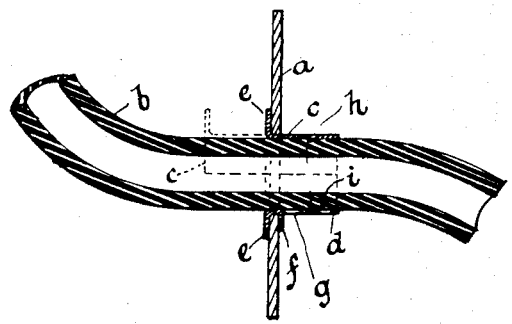
Figure 2:
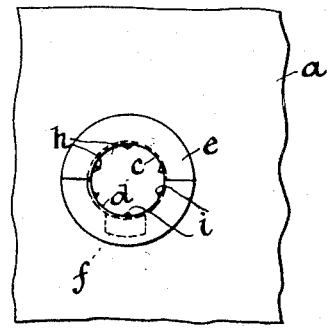
Figure 3:
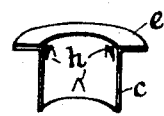
Figure 4:
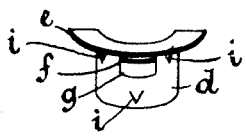
Figure 5:
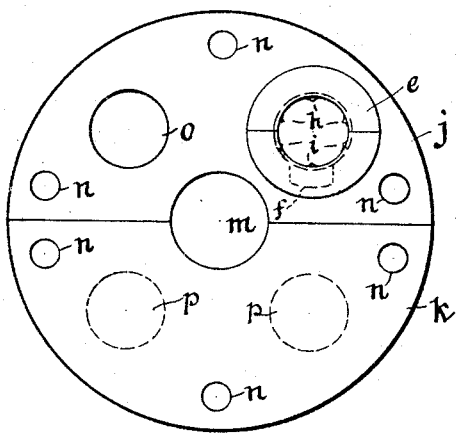

Figure 1 is a longitudinal section through a plate and the center of a circular hole therein, showing the tubing passing through the hole and my device in position; Fig. 2 is a view from the left hand side of the plate in Fig. 1, showing the device in position but the tubing omitted; Figs. 3 and 4 are perspective views of the two halves of the bushing, respectively; Fig. 5 is a plan view of a plate especially adapted to fit under the canopy of a ceiling or wall outlet for gas-fixtures and to hold the electric wiring in place adjacent thereto.

In these drawings each reference letter or numeral refers to the same part wherever used.

In Fig. 1, the plate designated *a* may indicate the wall of a cut-out box, or any plate through which the electric wiring has to pass, said electric wiring being provided with a sheathing of flexible insulating tubing *b* (shown in section) passing through a circular aperture in the plate.

My invention consists of a bushing which is formed of the two members *c* and *d*, illustrated separately in Figs. 3 and 4 respectively. Each of these members consists of a piece of sheet metal the body of which is of semi-cylindrical form, and which has at one end a broad flange *e* at right angles to the axis of the cylindrical portion. In addition to the flange *e* the member *d* has a further flange *f*, which is parallel to the flange *e* and separated from it by a distance substantially equal to the thickness of the plate *a*, said flange *f* being formed by cutting a tongue out of the cylindrical portion and pressing it up at right angles thereto so as to leave a hole *g*, which performs no function so far as the invention is concerned, but is merely illustrated to show the preferred manner of forming the flange *f*. Each of the two members *c* and *d* has, further, inwardly projecting points or barbs, *h* and *i*, which are formed on the cylindrical portion by punching V-shaped cuts in the metal and pressing the points of the V's inwardly; and it is to be particularly noted that the barbs *i* of the member *d* point toward the right, that is to say, away from the flange *e*, and the barbs *h* toward the left, to wit, toward the flange *e*.

The manner of using the invention is as follows: The member *d* of the bushing is first placed in position in the hole in the plate *a*, so that the flanges *e* and *f* thereof lie on opposite sides of the plate and the member is prevented from moving longitudinally with respect to the plate. The tubing *b* is then inserted in the hole from the left-hand side in Fig. 1 so that it passes freely over the points or barbs *i* as far as may be required. The other member *c* of the bushing is now inserted in place, first occupying the dotted-line position of Fig. 1 and then pushed into the full-line position between the tubing *b* and the edge of the hole in the plate *a*. In this operation, the barbs *h* also pass freely over the surface of the tubing. The tubing is now secured in place, being prevented from moving toward the right by the engagement of the barbs *h* with its surface and it is prevented from moving toward the left by a like engagement with the barbs *i*. Therefore it is held firmly in place and cannot become detached of itself. Should, however, it be desired to release the tubing, this is done by passing a knife-blade or thin sheet of metal between it and the member *c* so as to bend up the points of the barbs *h* or prevent them from coming in contact with the surface of the tubing; the member c can be then readily withdrawn and the tubing pulled out toward the right.

In Fig. 5 is shown a particular form of plate adapted for outlets for combination gas-and-electric fixtures, this plate comprising the two semicircular members j and k having each a semicircular central recess and forming together an aperture m of a size to fit a gas-pipe and permit its passage therethrough. The two semicircular pieces j and k are secured in place by screws or other fastenings passing through holes n. One of the plates is also provided with two circular holes o adapted to pass a flexible tube b therethrough and receiving my bushing in the same way as illustrated in Fig. 1. The left-hand hole o is shown empty, and a bushing is shown in place in the right-hand hole. On the plate k are formed knock-outs p, that is to say, circular portions are nearly detached by means of cuts in the metal so that they can be knocked out by a hammer, in case two additional wire-openings are required.

Various changes and modifications in the construction as herein shown may be made without departing from the spirit of my invention, and I wish it understood therefore that the latter is not otherwise limited than by the proper scope of my claims.

Having thus described my invention, what I claim as new and desire to secure by Letters Patent is:

1. Means for securing flexible insulating tubing in place comprising a bushing in two coöperating halves with wall-engaging means, one of which halves has barbs pointed inwardly in one direction so as to engage the tubing and the other barbs pointed inwardly in the opposite direction so as to engage the tubing.

2. In combination with an element having an aperture, means for securing flexible insulating tubing in place in said aperture comprising a bushing in two coöperating halves, one of which has barbs pointed inwardly in one direction to engage the tubing and the other having barbs pointed inwardly in the opposite direction to engage the tubing, each half having a flange to abut against said element to secure it in position against longitudinal movement with respect thereto.

3. In combination with an element having an aperture, a device of the class described comprising two semi-cylindrical members each having a flange on one end to abut against said element and inwardly projecting barbs to engage a tube or wire passing through said device, the barbs on one member pointed in one direction and those on the other member pointed in the opposite direction.

4. A device of the class described, comprising a bushing in two semicylindrical halves, each of which has one or more barbs on the internal surface projecting in one direction on one half and in the other direction on the other half; one of said halves having a pair of plate-engaging flanges, and the other half having a single plate-engaging flange.

5. A device of the class described comprising a bushing formed in two coöperating semicylindrical halves each of which is of sheet metal and has formed on one end a semicircular flat plate-engaging flange; one of said halves having also a second plate-engaging flange parallel to the first; said last-named half having one or more barbs on its inner surface pointed away from said first-named flange; and the other member having one or more barbs on its inner surface pointed toward said first-named flange.

In witness whereof I have hereunto set my hand this 2nd day of November 1912.

C. M. WHEELOCK.

Witnesses:
W. SCHULTZ, Jr.,
W. J. TULL.